Figure 1:
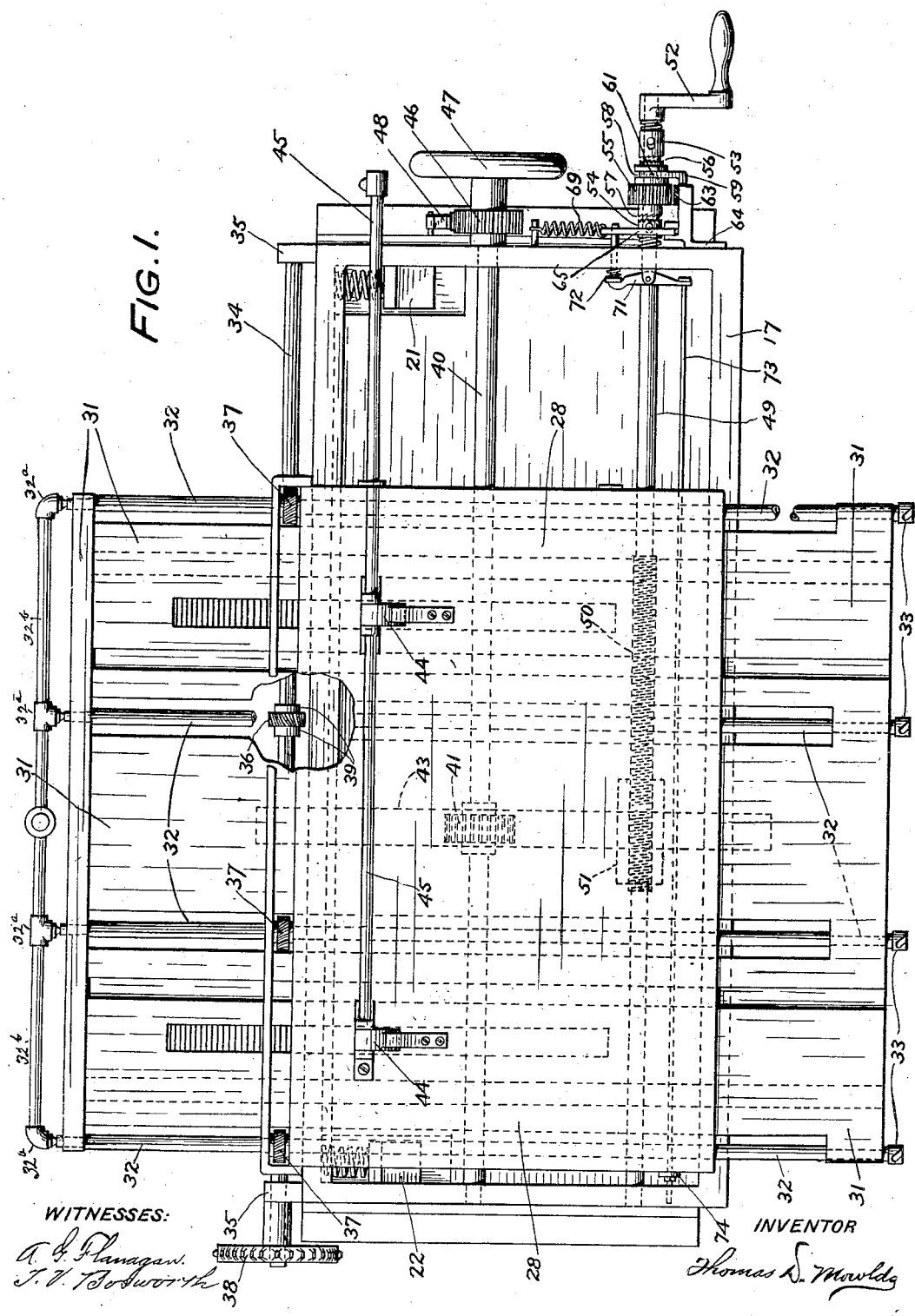

No. 880,903. PATENTED MAR. 3, 1908.
T. D. MOWLDS.
ROCK CHANNELING MACHINE.
APPLICATION FILED MAY 23, 1907.

5 SHEETS—SHEET 1.

WITNESSES: INVENTOR
Thomas D. Mowlds

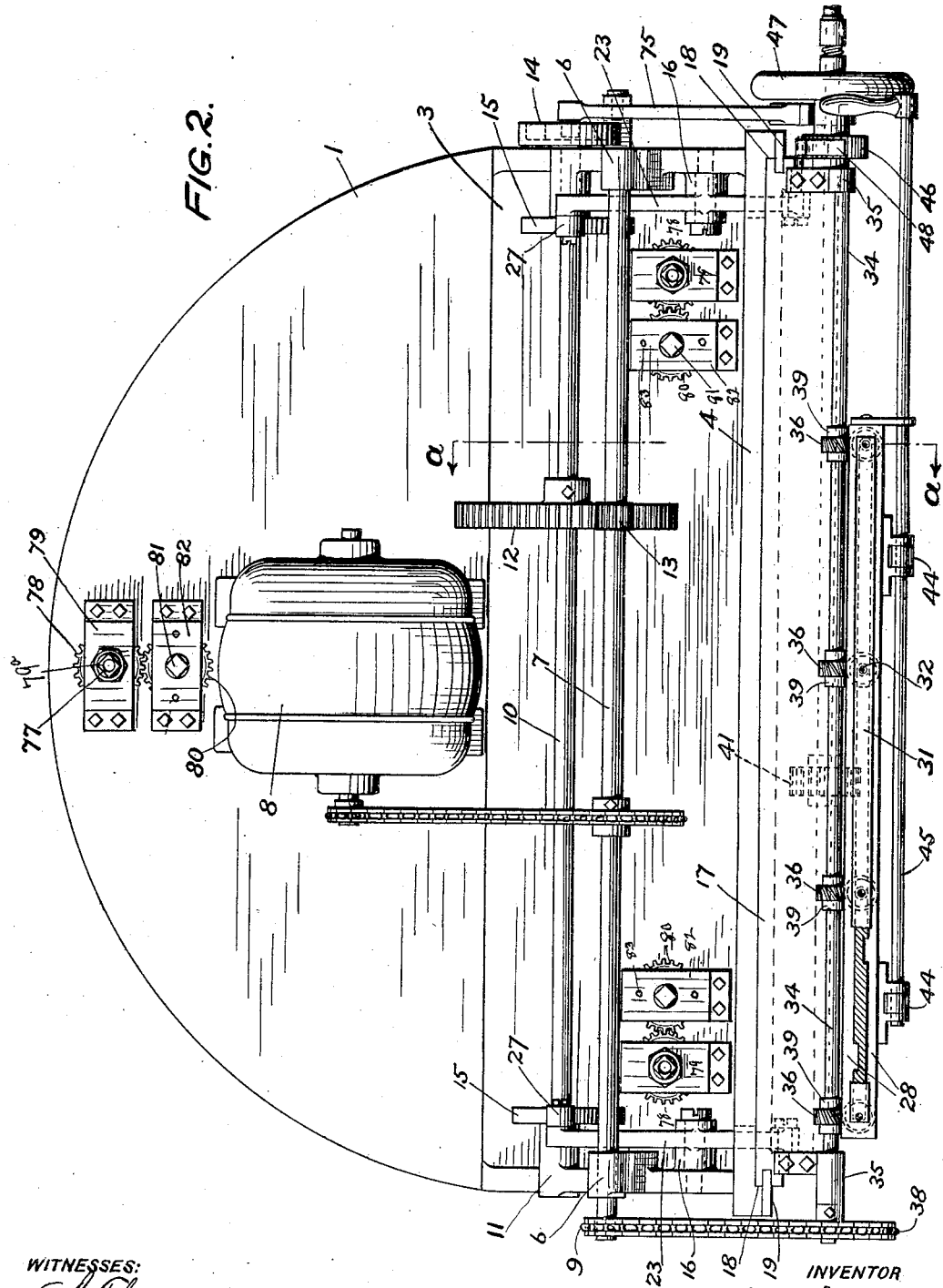

No. 880,903. PATENTED MAR. 3, 1908.
T. D. MOWLDS.
ROCK CHANNELING MACHINE.
APPLICATION FILED MAY 23, 1907.
5 SHEETS—SHEET 3.
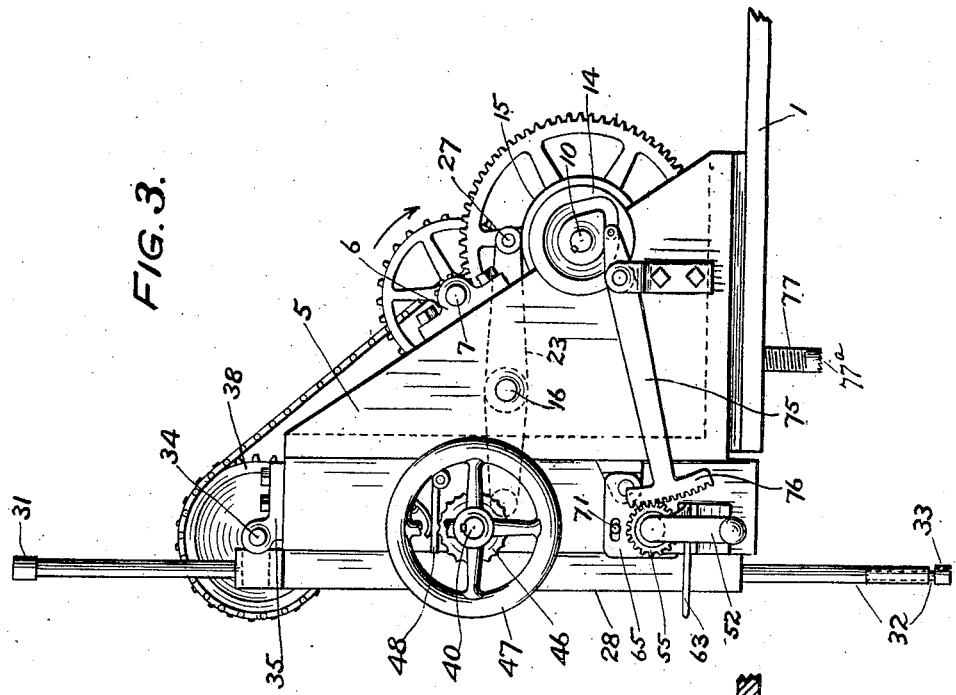
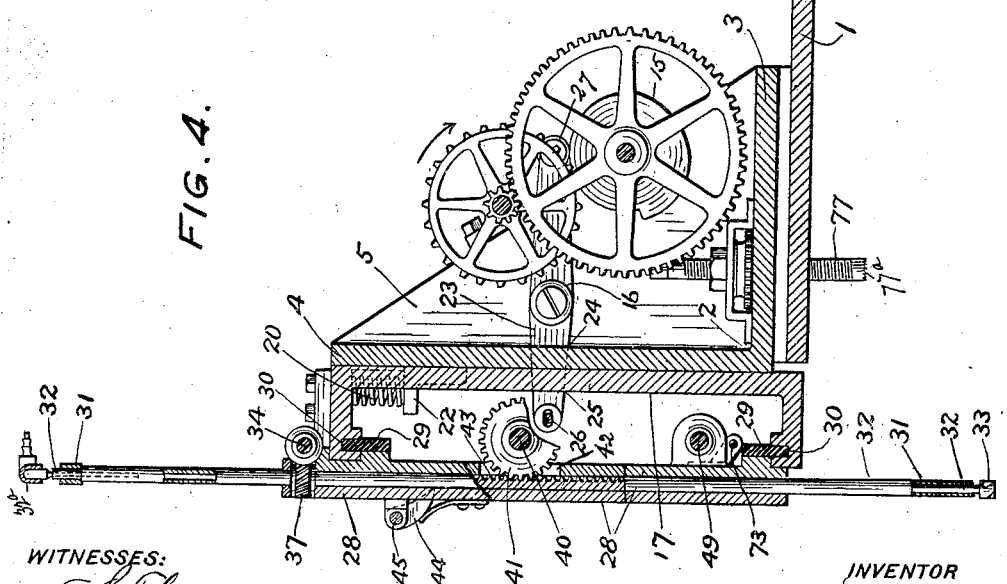
WITNESSES:
A. F. Flanagan.
J. V. Bosworth.
INVENTOR
Thomas D. Mowlds.

No. 880,903. PATENTED MAR. 3, 1908.
T. D. MOWLDS.
ROCK CHANNELING MACHINE.
APPLICATION FILED MAY 23, 1907.

5 SHEETS—SHEET 4.

WITNESSES:
A. F. Flanagan.
J. V. Bosworth.

INVENTOR
Thomas D. Mowlds

No. 880,903. PATENTED MAR. 3, 1908.
T. D. MOWLDS.
ROCK CHANNELING MACHINE.
APPLICATION FILED MAY 23, 1907.

5 SHEETS—SHEET 5.

WITNESSES:
A. J. Flanagan.
J. V. Bosworth.

INVENTOR
Thomas D. Mowlds

UNITED STATES PATENT OFFICE.

THOMAS D. MOWLDS, OF BALA, PENNSYLVANIA.

ROCK-CHANNELING MACHINE.

No. 880,903.   Specification of Letters Patent.   Patented March 3, 1908.

Application filed May 23, 1907. Serial No. 375,248.

*To all whom it may concern:*

Be it known that I, THOMAS D. MOWLDS, a citizen of the United States, residing at Bala, in the county of Montgomery and State of Pennsylvania, have invented certain new and useful Improvements in Rock-Channeling Machines, of which the following is a specification.

This invention relates to improvements in rock-channeling machines, and has particular reference to that class of machines used for the purpose of cutting channels in rocks as they lie in their natural beds in a quarry; and has for its object the provision of a comparatively light and inexpensive machine that may be easily moved and adjusted to position with little trouble; and one that will cut a narrow channel in the rocks operated upon, and that will require a comparatively small amount of motive power for its operation; a further object of the invention is to prevent or avoid an unnecessary waste of rock in cutting, and this I accomplish by so constructing and operating the device that only a very narrow channel will be cut.

The invention further consists in the novel construction, arrangement, and combination of the several parts of the device hereinafter described, illustrated in the drawings, and more particularly pointed out in the claims hereunto appended.

Figure 7:
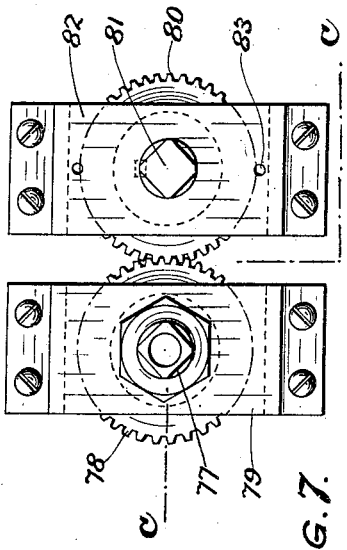
Figure 8:
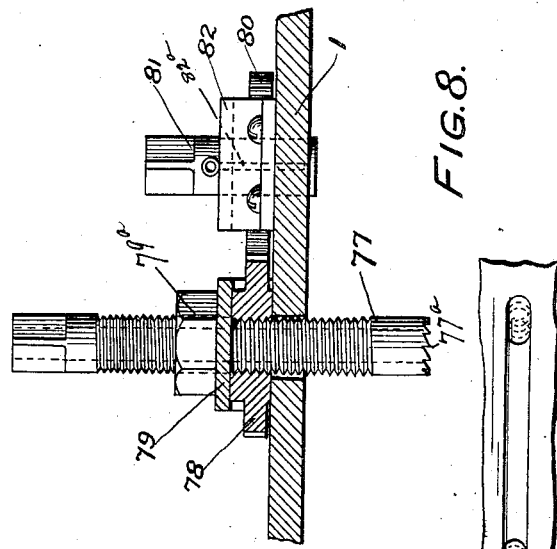
Figure 5:
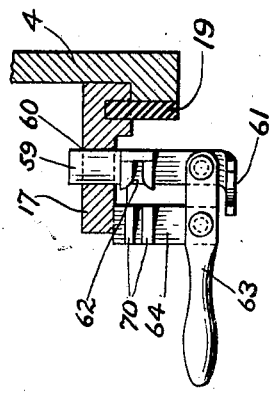
Figure 6:
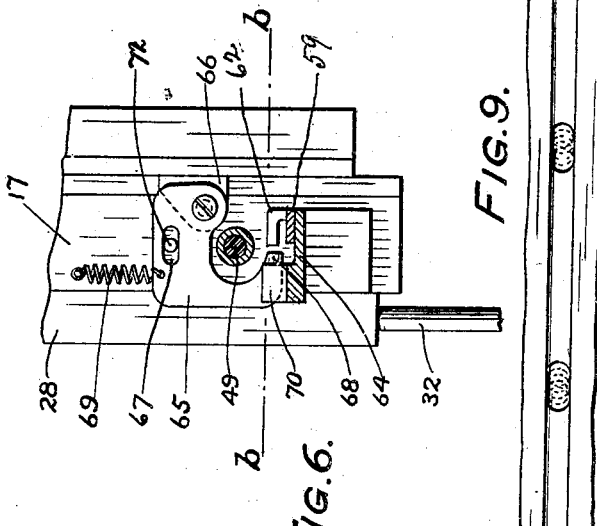
Figure 9:
Figure 12:
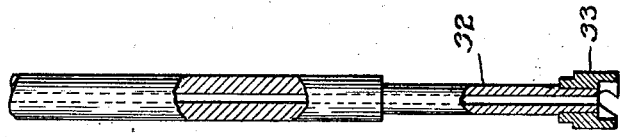
Figure 11:
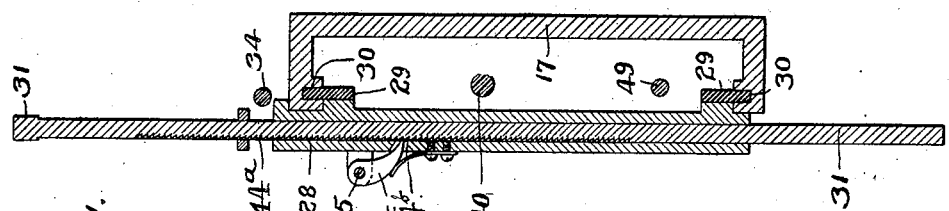
Figure 10:
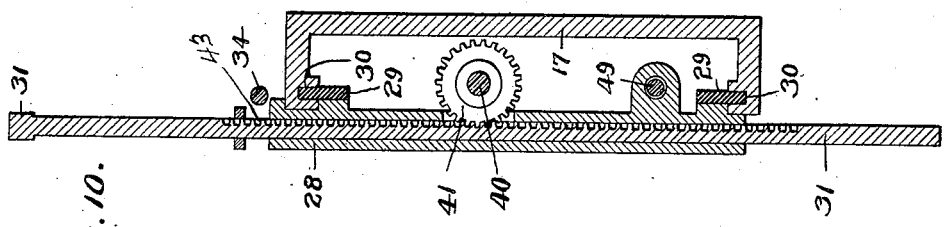
Figure 13:
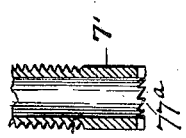

In the drawings: Figure 1 shows a front elevation of the machine; Fig. 2 is a plan view thereof; Fig. 3 is an end elevation of the machine; Fig. 4 is a cross-section taken on the line *a—a* of Fig. 2 the same being broken away to show the rack 43 engaged by the pinion 41; Fig. 5 is a horizontal section taken on the line *b—b* of Fig. 6; Fig. 6 is a partial end view showing mechanism for shifting the pinion 55 on the shaft 49, to stop the rotation of said shaft; Fig. 7 is a plan detail view of the cylindrical supporting legs, and mechanism for locking the same in position; Fig. 8 is a sectional view taken on line *c—c* of Fig. 7, showing in detail the construction of the cylindrical supporting legs, and the means for operating and locking the same in the platform; Fig. 9 is a plan view of a section of rock, showing a full cut from left to right and a partial cut from right to left, the dotted lines showing the crescent-shaped part that is cut away at each downward movement of the cutters. Fig. 10 is a vertical cross-section showing the vertically movable drill shaft holder, the rack 43 carried thereby, pinion 41 engaging said rack, and parts contiguous to said rack and pinion. Fig. 11 is a vertical cross-section, showing the vertically movable drill shaft holder, rack 44$^a$ carried thereby, and pawls 44 for engaging said rack to hold the drill shaft holder down to working position. Fig. 12 is a view in elevation, partly in section, of the lower portions of one of the drill shafts, and Fig. 13 is a vertical sectional view through one of the tubular supports or legs, showing saw-teeth at the lower edge thereof.

Referring to the drawings by numerals, 1 indicates the table or platform upon which is mounted and supported the operative parts of the machine.

The numeral 2 indicates a suitable frame mounted on the table or platform 1, and rigidly secured thereto, and consists of a horizontal portion 3 and a vertical portion 4, as shown.

5, 5, indicate plates at each end of said frame, rigidly secured thereto, and forming in addition to their other functions, hereinafter set forth, stays or braces for the upright portion 4 of the frame 2. Mounted in said frame 2 in suitable bearings 6, 6, is the main driving shaft 7 of the device, having thereon suitable means for connection with a motor 8, located, preferably, on the table of platform 1, or with any other suitable source of power. This shaft 7 is also provided on one end thereof, preferably to the outside of the frame 2, with a sprocket or pulley 9, for a purpose hereinafter stated.

The numeral 10 indicates a shaft mounted in suitable bearings 11, 11, in the ends of said frame 2, and is parallel with said driving shaft 7, as shown. Rigidly mounted on the shaft 10 is a suitable gear 12 adapted to mesh with a pinion 13 rigidly secured on the main driving shaft 7, as shown, whereby said shaft 10 is rotated from said driving shaft 7, as is evident. On one end of said shaft 10 to the outside of the frame 2, is provided a closed cam 14 rigidly secured thereon and adapted to be rotated therewith, and is for a purpose hereinafter stated. Rigidly mounted on the shaft 10, preferably within the frame 2, and adjacent to its bearings 11, are cams 15.

16, 16 indicate suitable studs, within said frame 2, secured at suitable points to the end plates 5, 5, thereof, and are for a purpose hereinafter set forth.

The numeral 17 indicates a vertically movable frame mounted in a suitable guide 18 in the outer face of the vertical portion 4 of the frame 2, and held thereto, preferably, by cleats or plates 19, 19, secured to said frame 2, as shown in Fig. 2, and is held, normally, in elevated position by the springs 20, 20, secured on suitable brackets 21 and 22 that are rigidly attached to vertical portion 4 of the frame 2, the tops of these springs impinging against the under side of the top of the vertically movable frame 17.

23, 23, indicate suitable levers pivotally mounted on the studs 16, 16, and have their inner ends extending through registering slots or openings 24, 25, in the frames 2 and 17, respectively, the inner ends of said levers being secured on suitable bolts or studs 26, 26, in the ends of said frame 17, while their outer ends are preferably provided with rollers 27, 27, adapted to ride upon the cams 15, 15, whereby said arms are rocked to depress said frame 17, during the operation of the machine, and at a predetermined interval to permit the springs 20, 20, to return said frame to normal position, as is evident.

The numeral 28 indicates a hollow horizontal movable drill-holder carrying frame mounted in the vertically movable frame 17, and suitably held therein by the guides 29, 29, which set and travel in the grooves 30, 30, in said frame 17, as shown. Mounted in the horizontally movable frame 28 is a vertically movable drill shaft holder 31 carrying a set or gang of hollow rotary drill shafts 32, each of said shafts having its lower end provided with a boring tool or cutter 33, having, preferably, a vertical channel therethrough, and its upper end connected by a suitable coupling 32$^a$ with an exhaust pipe 32$^b$, which in turn is connected with a suitable air blast, or air exhaust (not shown).

34 indicates a shaft mounted in bearings 35, 35, on the top and at opposite ends of the vertically movable frame 17, and carries the slidable splined pinions 36, 36, and are adapted to mesh with and operate corresponding pinions 37 splined on the drill shafts 32 to impart a rotary movement thereto. One end of said shaft 34 is extended to the outside of said frame 17 and is provided with a sprocket wheel or pulley 38 adapted to be engaged with the sprocket wheel or pulley 9 on the end of the main driving shaft 7, and be operated therefrom as is apparent. The pinions 36, 36 on the shaft 34 are caused to slide thereon by the loosely mounted collars 39, 39, to each side of each of said pinions, said collars being rigidly secured to the horizontally movable frame 28; the pinions 37, 37, are in stationary bearings in the top of the horizontally movable frame 28, and being splined on the drill shafts 32, said shafts have a vertically sliding movement therethrough, as is evident.

The numeral 40 indicates a shaft journaled in suitable bearings in the ends of the vertically movable frame 17, and has a slidable pinion 41 splined thereon and adapted to set through a slot or opening 42 in the inner wall of the horizontally movable frame 28 and engage a suitable rack 43 on the vertically movable drill shaft holder 31, whereby said drill shaft holder 31 may be raised or lowered, as occasion requires.

44, 44, are spring pressed pawls rigidly secured on a rod 45 rockably mounted on the outer face of the frame 28, adapted to set into and through slots or openings 44$^b$ in said outer face of the frame 28 and engage suitable racks 44$^a$ on said vertically movable drill shaft holder to hold the same down to its work when in operative position.

On one end of the shaft 40 to the outside of the frame 17 is a notched wheel 46 and a hand wheel, or other suitable means, 47 rigidly secured to said shaft, and are for the purpose of operating said shaft to raise and lower the drill shaft holder out of and into operative position, and 48 is a spring pressed stop or pawl adapted to engage the notched wheel 46 to hold the shaft 40 stationary. The notches in said notched wheel 46 are so spaced that when said wheel is turned one notch the drill shaft holder will be raised or lowered the distance of one cut. When it is desired to increase the depth of the cut a notched wheel having a greater distance between its notches is substituted, and when the depth of the cut is to be diminished a wheel having a less distance between its notches is used, as will be evident.

The numeral 49 indicates a shaft journaled in the ends of the frame 17, and having one end thereof projecting to the outside of said frame. This shaft 49 is provided with a screw-threaded portion 50, which is located thereon, preferably, about midway thereof. The screw-threaded portion 50 engages a suitable nut or stud 51 secured to the inner wall of the horizontally slidable frame 28, and is adapted to cause said frame to move backward and forward at proper intervals during the operation of the machine to shift the horizontal position of the cutters. The outer end of the shaft 49 is provided with a suitable handle 52, and between this handle and the end of the frame 17 with two oppositely disposed splined spring-pressed ratcheted collars 53 and 54. On said shaft 49 between said ratcheted collars 53, 54 is a loosely mounted slidable pinion 55 having hubs at each side thereof, the faces of said hubs being provided with ratchets 56, 57, set at an angle opposite to those on the adjacent ratcheted collar with which it is adapted to be engaged.

58 indicates a groove in the periphery of one of said hubs, and 59 indicates a suitable slide sitting in a slot 60 in the end of the frame 17 and adapted to slide therein, and having its outer end terminating in a yoke or fork 61 and engaging the groove 58 of the pinion 55, to shift said pinion into and out of engagement with one or the other of said ratcheted collars, as is evident.

62 indicates a wedge-shape seat on said slide 59 to the outside of the frame 17, and is for a purpose hereinafter stated. 63 indicates a lever connected to said slide 59 and pivoted to the bracket 64 secured to the end of the frame 17, the slide 59 resting on the bracket 64 whereby it is held in a horizontal position and in engagement with said pinion 55, as is apparent.

65 is a lever pivoted to a bracket 66 secured to the frame 2 and is provided with a slot or opening 67 near its top, its lower end 68 being, preferably, wedge-shape; said lever 65 being held, normally, in an elevated position by the spring 69. The lower wedge shaped end of the lever 65, rests normally between the lugs 70, 70, on the bracket 64 on a level with and opposite the wedge-shape seat 62 on the slide 59, as shown in Fig. 5.

The numeral 71 indicates a lever pivoted to the end of the frame 17 to the inside thereof, one end thereof being adapted to contact with and actuate a spring pin 72 mounted in a suitable opening in said frame 17 and adapted to be thrust into and be withdrawn from the slot or opening 67 of the lever 65, the opposite end of said lever 71 being connected to one end of a rod 73, the opposite end of said rod being slidably mounted in one end of said frame 17, as shown. Secured on said rod 73 near the sliding end thereof is a stop or buffer 74, adapted to be struck by the horizontally movable frame 28 in its movement to shift said rod 73 and operate the mechanism connected therewith to cause said frame 28 to be stopped in its movement in that direction. The wedge-shape seat 62 on the slide 59, which is normally opposite the lugs 70, 70, on the bracket 64, is adapted to receive the wedge-shaped end 68 of the lever 65 when the latter is locked to the frame 17 by the pin 72, when said frame 17 is depressed, whereby said slide 59 is shifted to shift the pinion 55, out of engagement with the ratcheted collar 53 or 54, with which it may be engaged at the time, to a position intermediate said ratcheted collars, and thus stop the horizontal movement of said frame 28, as is evident. The numeral 75 indicates a pivoted rack arm having one end thereof engaging the closed cam 14 on the shaft 10, and its opposite end provided with a segmental rack 76 adapted to engage the pinion 55 on the extended end of the shaft 49 and impart rotation thereto, as is apparent. With this construction the rotation of the shaft 49 is automatically stopped, and when it is desired to again start its rotation the slide 59 is still further shifted by means of the lever 63 to cause said pinion 55 to engage with one of said ratcheted collars. It will be apparent that this shifting of the slide to engage the pinion 55 with one of the ratcheted collars may be automatically accomplished by increasing the angle of the sides of the wedge-shape seat 62 on the slide 59 whereby an increased length of movement will be given said slide, so that when said pinion is taken from engagement with one of said ratcheted collars it will be thrown into engagement with the opposite one, as is evident.

The table or platform 1 is mounted on adjustable tubular legs or supports 77, 77, preferably three in number, two of said legs or supports being positioned in the forward part of said table or platform, one near each end thereof, and the third leg or support at or near the rear part thereof, as shown, as by this arrangement the table or platform may be more easily and accurately adjusted to set the cutters in the desired position. These legs or supports 77 are exteriorly screw-threaded and are set and held in internally screw-threaded pinions 78 which are held in position by suitable straps 79 secured to said table or platform 1, or to the horizontal portion 3 of the frame 2, as shown.

79$^a$ indicates a lock or jam nut on the threaded portion of the support 77 above the strap 79.

The feet or lower ends of the legs or supports 77 are, preferably, provided with saw-teeth 77$^a$, or other suitable cutting edges; while the upper ends thereof are finished to receive a wrench or other suitable device, whereby said legs or supports may be screwed down for the purpose of cutting for themselves seats in the rock upon which they rest. After the legs or supports 77 have been turned down a sufficient distance to cut a seat deep enough to securely hold the device supported thereby and prevent creeping, the platform 1, carrying the channeling machine, is adjusted to the desired position for operation. To accomplish this end I provide an adjusting means, shown in Figs. 7 and 8, wherein a pinion 80, similar to the pinion 78, is rigidly anchored on a short shaft 81, and meshes with said pinion 78, being held in position by a suitable strap 82 secured on the platform 1, or on the frame 2, as is evident. If after the legs or supports 77 are screwed down to the desired position, it should be found that the platform is not in the exact position necessary to place the cutters in the correct position for cutting, these legs or supports 77 may be further adjusted by means of the shaft 81 and the pinion 80 carried thereby, to place the cutters in the exact position desired. The pinion 80 and consequently the pinion 78, with which it meshes, is locked in position by passing a rod or pin 82$^a$, through the opening 83 in the strap 82 and between the cogs on the pinion 80, whereby said platform and the parts carried thereby will be maintained in position, as is evident. When the whole machine has been properly adjusted the jam nut 79ª is screwed down tightly against the strap 79.

The cutting tools or cutters 33 are circular in cross-section and of a diameter slightly in excess of the thickness of the drill shaft holder 31, in order to cut a channel sufficiently wide for the descent of said drill shaft-holder into the channel made by said cutters, which is, of course, necessary when a deep channel is to be cut. The cutting face of these cutters is on their bottoms, and they are, therefore, adapted to make a downward cut only, which downward cut usually is about one-fourth of an inch deep, but it is evident that it may be of a greater or less depth if so desired. It will be observed that the cutter shafts and therefore the cutters carried thereby are mounted in the drill shaft holder at equal distances from each other. This equal spacing of the cutters is done so that, during the horizontal movement thereof, each cutter, except the forward one, on its last downward movement will enter the cut first made by the next preceding one. In cutting a channel with this machine, the cutters are withdrawn a distance a little greater than the depth of the cut so that they may be shifted one step forward, the distance of this step being, preferably, about one-fourth the diameter of said cutters, the cutters are then lowered into contact with the rock and the second cut is made, and this process is continued until a complete channel is cut. The direction of movement of the horizontal frame 28 is then changed, moving the cutters in the opposite direction and repeating the operations of the first cut. By reason of shifting the cutters a distance not exceeding one-fourth their diameters, the side walls of the channel will be practically even thus providing a channel throughout its entire length having a width slightly greater than the diameter of the cutters, which will at all times permit the horizontal shifting therethrough of the drill shaft holder 31, and thus obviate the necessity of entirely withdrawing said holder and cutters from the channel every time a horizontal shift is made. This feature of the invention is a very valuable one in that a great amount of time and labor is saved in the operation of the device.

The several parts of the machine being constructed and assembled as shown, the operation is as follows: The table or platform 1 is first adjusted, through its adjustable legs, to the proper angle on the rock and as close thereto as is practicable, and the cutting tools 33 are raised or lowered until they are on a line slightly above the bottoms of the adjustable legs, and power being applied the operating parts of the machine are set in motion. The frame 28 carrying the cutters is then brought to the position shown in Fig. 2, the beginning of the cut. The driving sprocket being turned in the direction indicated by the arrow, Fig. 4, causes the shaft 10 and the cams 15, 15, mounted thereon to be rotated. This movement of the cams acting through the levers 23, 23, depresses the frame 17 carrying with it the frame 28, and the drill shaft holder 31 mounted therein, thus placing the cutters 33 in close proximity to the rock in which the channel is to be cut. The extent of the downward movement of the frame 17 is regulated by the distance between the highest and lowest points of the cams 15, 15, as is evident. After the ends of the levers 23, 23 have passed the highest points of the cams 15, 15, the springs 20, 20, will quickly return said frame 17, and the parts carried thereby, to their normally raised position and withdraw the cutters from the cut just completed. While the cutters are in this elevated position, the pinion 55 having been brought into engagement with the ratcheted collar 53, the movement of the rack arm 75, operated by the closed cam 14, will cause the shaft 49 to turn partially around and thus move the frame 28 horizontally carrying the cutters one step further forward. This operation is repeated until the frame 28 has moved to the opposite side of the machine, when the forward end of said frame 28 will impinge against the end of the lever 71 and force the pin 72 into the slot 67 of the pivoted lever 65, and at the next downward movement of the frame 17, being the movement making the last cut in the end of the channel, the pivoted lever 65 will be pushed downwardly and the wedge-shaped end 68 thereof forced into the wedge-shaped seat 62 on the slide 59, shifting said slide and taking the pinion 55 out of contact with the ratcheted collar 53 and holding it intermediate of the two ratcheted collars 53, 54. The wheel or handle 47 is now turned slowly until the notched wheel 46 has been moved one notch, this movement will partially rotate the shaft 40 and pinion 41 thereon and carry the drill shaft holder 31 and the cutters 33 carried thereby, down into the rock the distance of the next cut, after which the pinion 55 is thrown, preferably by means of the handle 63, into engagement with the ratcheted collar 54, and the movement of the rack arm 75 will cause the frame 28 and the cutters carried thereby to move in the opposite direction.

In order that the rack arm 75 may operate the shaft 49, in opposite directions at different times, the movement of said shaft is made in one direction on the downward movement of the rack 76, on the end of the rack arm 75, and in the opposite direction on the upward movement of said rack 76, as is evident. The lateral movement of the frame 28 is always stopped automatically, and ready for reversal by reason of said frame operating upon the lever 71, which forces the pin 72 into the slot 67 of the pivoted lever 65, which latter operates at the proper time to shift the slide 59 and thus disengage the pinion 55 from one of the said ratcheted collars.

When it is desired to raise the drill shaft holder 31 out of the channel, the spring pressed pawls on the outer face of the frame 28 are disengaged from their racks and the hand wheel 47 is turned, which turns the shaft 40 and the pinion 41 splined thereon and raises said holder to an elevated position.

To keep the channel clean and prevent the cutters being choked up with the cuttings, a current of compressed air may be forced down through the hollow drill shafts 32 and out through the central part of the cutters 33, at intervals as frequently as may be necessary, or if so desired the cuttings in the channel may be exhausted through said hollow drill shafts and carried to a suitable point and there discharged.

It is evident that the extent of the downward movement of the frame 17 may be varied or changed, by changing the size of the cams 15, 15, as also may the extent of movements of other parts of the device be varied or changed by increasing or diminishing the size of the parts operating them respectively.

Having thus described my invention what I claim is:

1. A rock channeling machine having in combination therewith, a vertically movable frame, a laterally movable frame mounted therein, and vertically adjustable rotary cutters carried by said laterally movable frame.

2. A channeling machine having in combination therewith a vertically and laterally movable cutter carrying frame, rotary cutters carried by said frame and having an adjustable vertical movement independent thereof, means for adjusting said cutters vertically, and rotary means for moving said frame laterally.

3. A channeling machine having in combination therewith a vertically movable frame, a laterally movable frame mounted therein and carried thereby, a set or gang of rotary cutters mounted in said laterally movable frame, mechanism for automatically depressing said vertically movable frame, and mechanism for returning the same to normal position.

4. A channeling machine having in combination therewith a laterally movable drill carrying frame, a drill shaft holder mounted therein and capable of vertical movement, means for moving said drill shaft holder vertically, and independent means for holding said drill shaft holder in depressed position.

5. A channeling machine having in combination therewith a vertically movable frame a laterally movable drill shaft carrying frame carried thereby, means for moving said frame laterally and means connected therewith for automatically causing a step by step movement of said laterally movable frame at proper intervals.

6. A channeling machine having in combination therewith a drill carrying frame capable of a vertical and a lateral movement a vertically movable drill shaft holder mounted therein, rotary drills mounted in said holder, and means carried by said laterally movable frame to impart a rotary motion to said drills and at the same time permit said drills to move downwardly independently of the vertical movement of said laterally movable frame.

7. A channeling machine having in combination therewith a vertically movable frame, a laterally movable frame mounted therein and carried thereby, mechanism adapted to depress said vertically movable frame, mechanism adapted to move said laterally movable frame, and mechanism adapted to be operated by the downward movement of the vertically movable frame to stop at the proper interval the forward movement of said laterally movable frame.

8. A channeling machine having in combination therewith a vertically movable drill shaft holder, a set or gang of hollow drill shafts mounted vertically therein and capable of a rotary movement, cutting tools on the ends of said shafts of a diameter slightly in excess of the thickness of said drill shaft holder, a pipe connecting the upper ends of said shafts with an air blast or exhaust and suitable couplings between the upper ends of said shafts and said pipe to permit the rotation of said shafts.

9. A channeling machine having in combination therewith a drill carrying frame adapted to have an intermittent vertical movement and a step by step lateral movement, mechanism for imparting such vertical movement to said frame, mechanism for moving said frame laterally, and a mechanism located in the path of lateral movement of said frame, adapted to be actuated by said frame, at the proper interval, to stop the forward lateral movement of said frame.

10. A channeling machine having in combination therewith a rotary-drill carrying frame adapted to have an intermittent vertical movement and a step by step lateral movement, mechanism for imparting intermittent vertical movement to said frame, rotatable mechanism engaging said frame to impart lateral movement thereto, and means engaging said rotatable mechanism to impart rotation thereto at proper intervals.

11. A channeling machine having in combination therewith a rotary-drill carrying frame adapted to have an intermittent reciprocating vertical movement and a step by step lateral movement, mechanism for imparting intermittent vertical movement to said frame, a screw-shaft engaging said frame, means mounted on said shaft and adapted to impart rotation thereto, and mechanism, connected with a suitable source of power, adapted to operate said means to rotate said shaft and move said frame laterally with a step by step movement.

12. A channeling machine having in combination therewith a drill carrying frame having a lateral step by step movement, a screw shaft mounted in said machine and engaging said frame, a pinion loosely mounted on said shaft, and having ratchets on its opposite faces, ratcheted collars secured on said shaft to each side of said pinion, means for shifting said pinion out of engagement with said ratcheted collars, and mechanism for operating said pinion to turn said shaft to move said frame.

13. A channeling machine having in combination therewith a laterally movable drill carrying frame, a rotary shaft connected with said frame to give the same a step by step longitudinal movement, a pinion loosely mounted on said shaft and having ratchets on its opposite faces, ratcheted collars secured on said shaft to each side of said pinion, means for shifting said pinion into engagement with said collars, a slide for shifting said pinion out of engagement with said ratcheted collars, and means for automatically shifting said slide.

14. A channeling machine having in combination therewith a vertically movable part, a laterally movable drill carrying frame, a rotary shaft connected with said frame to give the same a step by step longitudinal movement, a pinion loosely mounted on said shaft and having its opposite faces ratcheted, ratcheted collars secured on said shaft to each side of said pinion, a slide for shifting said pinion out of engagement with said ratcheted collars, and means operated by said vertically movable part to shift said pinion through the medium of said slide, and means for shifting said pinion into engagement with said ratcheted collars.

15. A channeling machine having in combination therewith a vertically movable part, a laterally movable drill carrying frame, a rotary shaft connected with said frame to give the same a step by step longitudinal movement, a pinion loosely mounted on said shaft and having its opposite faces ratcheted, ratcheted collars mounted on said shaft to each side of said pinion, a slide mounted in said machine and connected with said pinion, means operated by said vertically movable part adapted to shift said slide to move said pinion out of engagement with said ratcheted collars, and a cam and cam-controlled mechanism for operating said pinion to rotate said shaft and move said frame with a step by step movement.

16. A channeling machine having in combination therewith a laterally movable rotary-drill carrying frame adapted to have an intermittent vertical movement, mechanism for imparting intermittent vertical movement to said frame, mechanism connected with said frame for imparting thereto a step by step lateral movement when the drills are raised in the channel being made a distance only sufficient to clear the cut just completed.

17. A channeling machine having in combination therewith a laterally movable rotary-drill carrying frame adapted to have an intermittent vertical movement, mechanism for imparting intermittent vertical movement to said frame, mechanism connected with said frame for imparting thereto a step by step lateral movement, and means, connected with a suitable source of power, for operating said mechanism to move said frame laterally when the drills are raised in the channel a distance only sufficient to clear the cut just completed.

18. A channeling machine having in combination therewith a laterally movable drill carrying frame, a shaft connected to said frame and adapted to impart a longitudinal step by step movement thereto, mechanism located on said shaft and adapted to cause the same to turn, and mechanism connected therewith and adapted to impart thereto a forward and then a reverse movement, whereby a change in the direction of rotation of said shaft is effected.

19. A channeling machine having in combination therewith a drill carrying frame having a step by step lateral movement, a drill holder carrying suitable drills or cutters mounted therein and adapted to have a vertical movement, means for lowering said drill shaft holder in said frame, and means carried by said frame adapted to engage said drill shaft holder to hold the same against upward movement.

20. A channeling machine having in combination therewith a drill carrying frame having a step by step lateral movement, a drill holder carrying suitable drills or cutters mounted therein and adapted to be moved vertically, means for raising and lowering said drill shaft holder in said frame, means carried by said frame adapted to engage said drill shaft holder to hold the same against upward movement, and means connected with a suitable source of power to impart rotary movement to said drills or cutters.

21. A channeling machine having in combination therewith a supporting table or platform, a plurality of tubular adjustable legs or supports upon which said platform is mounted and supported, said legs having their lower ends provided with cutting edges adapted to cut seats for themselves in the rock when turned down, means carried by said table or platform for adjusting the same with relation to said legs or supports, and mechanism for locking said table or platform in such adjusted position.

22. A channeling machine having in combination therewith a main driving shaft, connected to any suitable source of power, a second shaft parallel with said main driving shaft and geared therewith, a vertically movable frame mounted in said machine, depressing means located on said second shaft, and mechanism connecting said vertically movable frame with said depressing means, and means for returning said vertically movable frame to normal position.

23. A channeling machine having in combination therewith a main driving shaft, suitably connected with any source of power, a second shaft parallel to said main driving shaft and geared therewith, a vertically movable frame mounted in said machine, a cutter carrying frame mounted in said vertically movable frame and adapted to be moved laterally thereof, depressing means located on said second shaft, mechanism connecting said vertically movable frame with said depressing means, means for returning said vertically movable frame to normal position, and means connected with the main driving shaft and the cutters in said laterally movable frame for imparting a rotary movement to said cutters.

24. A channeling machine having in combination therewith a main driving shaft, a second shaft parallel to said main driving shaft and geared therewith, a vertically movable frame mounted in said machine, a cutter carrying frame mounted in said vertically movable frame and adapted to be moved laterally therein, depressing means located on said second shaft, mechanism connecting said vertically movable frame with said depressing means, means for returning said vertically movable frame to normal position, means connecting said laterally movable frame with said second shaft for imparting motion to said frame, and means connecting the main driving shaft and said cutters for imparting a rotary cutting movement thereto.

25. A channeling machine having in combination therewith a main driving shaft, a second shaft parallel to said main driving shaft and geared therewith, a vertically movable frame mounted in said machine, a cutter carrying frame mounted in said vertically movable frame and adapted to be moved longitudinally thereof, depressing means located on said second shaft, mechanism connecting said vertically movable frame with said depressing mechanism, means for returning said vertically movable frame to normal position, a combined rotary and rocking mechanism connecting said longitudinally movable frame with the shaft for imparting motion to said frame, and means connecting the main driving shaft and said cutters for imparting a rotary cutting movement thereto.

26. A rock channeling machine having in combination therewith a rotatable tubular support provided with a cutting edge around its bottom portion, and adapted to cut for itself an annular seat in the rock.

27. A rock channeling machine having in combination therewith a rotatable support, the bottom of which is made tubular in form and provided with an annular cutting edge that will, when the support is rotated, cut for itself an anular seat or socket in the rock.

28. A rock channeling machine having in combination therewith a platform, on which the operative parts of the machine are mounted, provided with a rotatable tubular support having a cutting edge around its bottom portion adapted to cut for itself an annular seat in the rock, whereby said platform may be adjusted to set the channeling drills of said machine into the desired operative position.

29. A rock channeling machine having in combination therewith a platform, on which the operative parts of the machine are supported, provided with a rotatable tubular support having a cutting edge around its bottom portion adapted to cut for itself an annular seat in the rock, means carried by said platform and engaging said rotatable support, whereby said platform may be adjusted with reference to said support to change the plane thereof to set the channeling drills of said machine into operative position.

30. A rock channeling machine having in combination therewith a platform, provided with a rotatable tubular support having a cutting edge around its bottom portion adapted to cut for itself an annular seat in the rock, a pinion mounted on said platform in which said tubular support is rotatably mounted, and adjusting means carried by said platform and engaging said pinion, whereby said platform may be adjusted with reference to said tubular support, after the same is seated in the rock, to change the plane of said platform, and mechanism for locking said adjusting means in position, substantially as described.

31. A rock channeling machine having in combination therewith a plaform, provided with a rotatable tubular support having a cutting edge around its bottom portion adapted to cut for itself an annular seat in the rock, a pinion mounted on said platform in which said support is rotatably held, an adjusting means carried by said platform and engaging said pinion, whereby said plat- 32. The herein described method of cutting a deep practically even sided channel, in rock or other material, with a rotary cutting tool, wherein said tool may be moved longitudinally of said channel without being removed therefrom, consisting of, first, cutting a circular hole a short distance down into the material, raising the tool out of this cut and advancing it a distance equal to one fourth, or less, the diameter of such tool, and repeating this operation until a channel of the desired length has been cut, secondly, repeating this operation back and forward until the channel has been cut to the desired depth.

33. The herein described method of cutting a continuous deep channel in rock or other material with a rotary tool or cutter without removing said tool from said channel during the process of cutting, consisting, first, of cutting a circular hole a short distance down into the material, then raising the tool out of this cut and moving it forward a short distance, generally less than one-fourth the diameter of the tool, again lowering the tool to make the next succeeding cut which will be crescent shape, and continuing these crescent shape cuts until a channel of the required length is made, afterwards repeating the operation back and forward until the channel is cut to the required depth, the cutting tool after each downward cut being raised just high enough in the channel to pass easily onto the bottom of the cut previously made, whereby the channel thus made will be of sufficient width throughout its entire extent to permit said cutting tool to be shifted horizontally back and forth throughout the length of said channel.

34. The herein described process of cutting a continuous deep even sided channel in rock or other material with a vertically cutting rotary tool or cutter without removing said tool from the channel during the process of cutting, consisting first, of cutting a circular hole a short distance down into the material, then raising the tool out of this cut and moving it forward a short distance, generally less than one fourth the diameter of the tool, again lowering the tool to make the next succeeding cut which will be crescent shape, and continuing these crescent shape cuts until a channel of the required length is made; afterwards repeating the operation back and forward until the channel is cut to the required depth, the cutting tool after each downward cut being raised just high enough in the channel, but not sufficiently high to remove it therefrom, to pass easily onto the bottom of the cut previously made, whereby the channel thus made will be of sufficient width throughout its entire extent to permit said cutting tool to be shifted horizontally back and forth throughout the length of said channel.

35. The herein described method of cutting a continuous channel in rock, or other material, with a rotary cutting tool without removing such tool from said channel, consisting of making a series of connected short and comparatively shallow crescent shaped downward cuts, said cuts extending from a suitable opening, forming a continuous channel in which the rotary cutting tool may be moved horizontally until a channel of the desired length is made; then lowering the cutting tool and making another and similar series of crescent shaped cuts, afterwards repeating the operation until the channel is cut to the required depth; the cutting tool after each downward cut being raised high enough in the channel to pass easily over the bottom of the cut previously made.

36. The herein described method of cutting a continuous channel in rock, or other material, with a rotary cutting tool without removing such tool from said channel, consisting of first forming an opening in the rock to extend a suitable distance downward and of sufficient size to accommodate the rotary cutting tool, afterwards elongating this opening by a connected series of short and comparatively shallow crescent shaped downward cuts that together form a continuous channel in which the rotary cutting tool may be moved horizontally, until a channel of the desired length is made, then lowering the cutting tool and making another and similar series of crescent shaped cuts, afterwards repeating the operation until the channel is cut to the required depth; the cutting tool after each downward cut being raised high enough in the channel to pass easily over the bottom of the cut previously made.

In testimony whereof I affix my signature in presence of two witnesses.

THOMAS D. MOWLDS.

Witnesses:
SADIE I. HARPER,
A. G. FLANAGAN.